United States Patent [19]

Nagai et al.

[11] Patent Number: 4,791,184

[45] Date of Patent: Dec. 13, 1988

[54] METHACRYLIC RESIN MOLDING MATERIAL AND METHOD FOR PRODUCTION THEREOF

[75] Inventors: Haruo Nagai; Tetsuo Suzuki; Kazuhiro Sato, all of Niigata, Japan

[73] Assignee: Kyowa Gas Chemical Industry Co., Ltd., Niigata, Japan

[21] Appl. No.: 67,932

[22] Filed: Jun. 29, 1987

Related U.S. Application Data

[63] Continuation of Ser. No. 906,798, Sep. 12, 1986, abandoned, which is a continuation of Ser. No. 715,474, Mar. 25, 1985, abandoned.

[30] Foreign Application Priority Data

Mar. 27, 1984 [JP] Japan ........................ 59-258

[51] Int. Cl.[4] ............................................. C08F 20/10
[52] U.S. Cl. ........................... 526/323.2; 526/329.7; 525/305; 525/308; 525/309
[58] Field of Search .................... 526/329.7, 323.2; 525/305, 308, 309

[56] References Cited

FOREIGN PATENT DOCUMENTS

| | | |
|---|---|---|
| 1494277 | 7/1967 | France . |
| 1566412 | 3/1969 | France . |
| 2108373 | 5/1972 | France . |
| 897395 | 5/1962 | United Kingdom . |
| 907261 | 10/1962 | United Kingdom . |

OTHER PUBLICATIONS

Journal of Applied Polymer Science, vol. 24, 1515-1521 (1979) Kaetsu, et al.
Chem. Abs. 101:56024g 08/1984 p. 35, 11/18/83.

*Primary Examiner*—Joseph L. Schofer
*Assistant Examiner*—N. Sarofim
*Attorney, Agent, or Firm*—Gordon W. Hueschen

[57] ABSTRACT

A methacrylic resin molding material, comprising a partially cross-linked polymer gel obtained by partially polymerizing a mixture comprising (A) a resin raw material selected from the group consisting of monomeric alkyl methacrylates, $\alpha, \beta$-ethylenically unsaturated monomer mixtures formed preponderantly of alkyl methacrylates and a syrup containing at least one of said monomers and at least one of the polymers thereof and (B) 4 to 150 parts by weight of a cross-linking agent based on 100 parts by weight of said resin raw material in the presence of a polymerization initiator, whereby a cross-linked polymer is formed with the aid of said cross-linking agent and said polymerization initiator to the extent that increase of the polymer formed thereby reaches 4 to 62% by weight over the polymer content of said mixture with the total polymer content kept from exceeding the upper limit of 62% by weight said molding material being recovered from the polymerization system as a non-sticky, easy-handled gel-like material which has shape-retaining properties, but which, on the application of shear stress, at normal room temperature or at an elevated temperature, is enabled to flow, and preserved for use in the manufacture of shaped articles.

33 Claims, No Drawings

4,791,184

METHACRYLIC RESIN MOLDING MATERIAL AND METHOD FOR PRODUCTION THEREOF

This is a continuation of application Ser. No. 906,798, filed Sept. 12, 1986, now abandoned, which is a continuation of Ser. No. 715,474, filed Mar. 25, 1985, now abandoned.

BACKGROUND OF THE INVENTION

1. Field of the Invention

This invention relates to a methacrylic resin molding material and to a method for the production thereof, and more particularly to a methacrylic resin molding material for the manufacture of a cross-linked shaped article and to a method for the production thereof.

2. Description of Prior Art

Generally, the methacrylic resin formed predominantly of methyl methacrylate enjoys excellent weatherability and outstanding transparency and, because of this salience, finds utility in applications to covers for lamps, parts for automobiles, signboards, ornamental articles and sundry goods. Since the aforementioned methacrylic resin is a linear polymer, however, it has some disadvantages that it is deficient in resistance to heat, resistance to solvents, resistance to shocks, and surface hardness. Regarding the resistance to heat, for example, the methacrylic resin withstands heat up to about 100° C. at most and, therefore, falls short of satisfying the needs arising from various applications for which resistance to heat is a requisite. In the case of parts for automobiles, the methacrylic resin cannot be used in covers for head lamps. In the case of tail lamps, since the amount of heat generated is growing because of increase in lamp size and increase in illuminance and the wall thickness of the cover is decreased to permit desired cost cut, the necessity of the covers of the lamps acquiring improved heat resistance is finding approval. The methacrylic resin is expected to find growing utility in applications to parts such as covers for meters on automobiles and two-wheelers (motorcycles) and covers for water heaters using solar energy which by nature experience great elevation of temperature under direct exposure to the sunlight. Thus, the development of a methacrylic resin composition capable of withstanding heat above the boiling point of water is longed for.

For the purpose of conferring improved heat resistance upon the methacrylic resin, there have been proposed numerous methods, e.g. a method resorting to copolymerization of methyl methacrylate with α-methyl styrene (U.S. Pat. No. 3,135,723), a method resorting to copolymerization of methyl methacrylate with α-methyl styrene and maleic anhydride (Japanese patent publication No. SHO 45(1970)-31,953 and No. SHO 49(1974)-10,156), and a method resorting to copolymerization of methyl methacrylate with α-methyl styrene and maleimide (Japanese patent laid-open No. SHO 48(1973)-95,490).

Indeed these methods are invariably capable of improving the methacrylic resin in heat resistance. Some of them, however, suffer from notably slow rate of polymerization or insufficient increase of conversion and, consequently, fail to obtain high conversion. Others, though capable of efficiently producing polymers rather quickly, suffer their products to assume color heavily and acquire transparency, weatherability, surface hardness and mechanical strength at levels lower than normally tolerated. Combining both merits and demerits, the conventional methods fall for short of being commercially feasible and have not been reduced to practice.

It is generally conceivable that introduction of a cross-linked configuration enables a polymer to acquire enhanced resistance to heat and to solvents. Since a cross-linked polymer has already formed a three-dimensional structure, it no longer can be molded by injection molding, extrusion molding or transfer molding. When the cross-linked polymer is molded by cast molding, it is liable to give rise to voids and bubbles. Thus, the cast molding of this cross-linked polymer fails to produce molded articles of complicated shape and suffers from inferior productivity.

Kodama et al., in their report inserted in Polymer Chemistry, Vol. 27, No. 297, p. 65, offer a statement, reading: "As one approach to the improvement of moldability of the cross-linked polymer, a method which comprises selecting a monomer having functional groups separated by a long distance from each other, setting this monomer polymerization while a fairly large proportion of the monomer still remains unaltered (above 90% of conversion), molding the first-stage polymer in a given shape, and thereafter performing the second-stage polymerization of the molded polymer until completion of the polymerization is conceivable." Despite this suggestion, they offer no working example of this method. In our repetition of the method described by Kodama et al., when the product of the first-stage polymerization was compression molded at elevated temperature in a metal die, the sample solidified and failed to flow and finally converted into a powder, thus showing absolutely no moldability. The term "molding" as used by Kodama et al. in the aforementioned statement means a very simple process of bending. It is not essentially synonymous with the molding process involving fluidity as aimed at by this invention.

An object of this invention, therefore, is to provide a novel methacrylic resin molding material and a method for the production thereof.

Another object of this invention is to provide a methacrylic resin molding material for manufacture of cross-linked molded articles and a method for the production of the resin material.

A further object of this invention is to provide a methacrylic resin molding material for manufacture of cross-linked molded articles excelling in physical properties such as heat resistance and resistance to solvents without any sacrifice of transparency and a method for the production of the molding material.

Still another object of this invention is to provide a methacrylic resin molding material of excellent storability for manufacture of cross-linked molded articles excelling in physical properties such as heat resistance and resistance to solvents without any sacrifice of transparency and a method for easy production of the molding material.

SUMMARY OF THE INVENTION

The objects described above are attained firstly by a methacrylic resin molding material, comprising a partially cross-linked polymer gel obtained by partially polymerizing a mixture comprising (A) a resin raw material selected from the group consisting of monomeric alkyl methacrylates, α,β-ethylenically unsaturated monomer mixtures formed preponderantly of alkyl methacrylates, and a syrup containing at least one of the above-mentioned monomers and at least one of the polymers thereof and (B) 2 to 250 parts by weight of a cross-linking agent based on 100 parts by weight of the resin raw material thereby allowing the polymer content of the resultant polymer gel to be increased by 4 to 62% by weight over the polymer content of the mixture with the total polymer content kept from exceeding the upper limit of 62% by weight.

The aforementioned objects are attained secondly by a method for the production of a methacrylic resin molding material formed of a partially cross-linked polymer gel, which comprises partially polymerizing a mixture comprising (A) a resin raw material selected from the group consisting of monomeric alkyl methacrylates, $\alpha,\beta$-ethylenically unsaturated monomer mixtures formed preponderantly of alkyl methacrylates and a syrup containing at least one of the above-mentioned monomers and at least one of the polymers thereof and (B) 2 to 250 parts by weight of a cross-linking agent based on 100 parts by weight of the resin raw material in the presence of a polymerization initiator thereby allowing the polymer content of the resultant polymer gel to be increased by 4 to 62% by weight over the polymer content of the mixture with the total polymer content kept from exceeding the upper limit of 62% by weight.

The aforementioned objects are attained thirdly by a method for the production of a methacrylic resin molding material formed of a partially cross-linked polymer gel, which comprises partially polymerizing a mixture comprising (A) a resin raw material selected from the group consisting of monomeric alkyl methacrylates, $\alpha,\beta$-ethylenically unsaturated monomer mixtures formed preponderantly of alkyl methacrylates, and a syrup containing at least one of the above-mentioned monomers and at least one of the polymers thereof and (B) 2 to 250 parts by weight of a cross-linking agent based on 100 parts by weight of the resin raw material in the presence of a polymerization initiator and a regulating agent thereby allowing the polymer content of the resultant polymer gel to be increased by 4 to 62% by weight over the polymer content of the mixture with the total polymer content kept from exceeding the upper limit of 62% by weight.

EXPLANATION OF THE INVENTION

The monomers usable as the resin raw material (A) in the present invention include alkyl methacrylates in their unadulterated form and mixtures of such alkyl methacrylates with alpha,beta-ethylenically unsaturated monomers copolymerizable therewith. In the case of such monomer mixtures, the alkyl methacrylate content is desired to exceed 50 mol%, preferably to exceed 60 mol%. Examples of the alkyl methacrylate include methyl methacrylate, ethyl methacrylate, n-propyl methacrylate, isopropyl methacrylate, n-butyl methacrylate, sec-butyl methacrylate and tert-butyl methacrylate. Among other alkyl methacrylates, methyl methacrylate proves particularly desirable.

Examples of the copolymerizable monomer include alkyl methacrylates (as such alkyl methacrylates: 2-ethylhexyl methacrylate, lauryl methacrylate and cyclohexyl methacrylate) other than alkyl methacrylate used as the main component (methyl methacrylate, for example), alkyl acrylates such as methyl acrylate, ethyl acrylate, n-propyl acrylate, isopropyl acrylate, n-butyl acrylate, 2-ethylhexyl acrylate and lauryl acrylate, cyclohexyl acrylate, hydroxyalkyl acrylates such as 2-hydroxyethyl acrylate, 2-hydroxypropyl acrylate, 3-hydroxypropyl acrylate, 4-hydroxybutyl acrylate and 2-hydroxy-3-chloropropyl acrylate, hydroxyalkyl methacrylates such as 2-hydroxyethyl methacrylate, 2-hydroxypropyl methacrylate, 3-hydroxypropyl methacrylate, 4-hydroxybutyl methacrylate and 2-hydroxy-3-chloropropyl methacrylate, acrylic acid, methacrylic acid, acrylates such as neodymium acrylate, lead acrylate, and boron acrylate, methacrylates such as neodymium methacrylate, lead methacrylate, and boron methacrylate, vinyl chloride, vinyl acetate, acrylonitrile, methacrylonitrile, acrylamide, methacrylamide, styrene, $\alpha$-methyl styrene, vinyl toluene and maleic anhydride.

The syrup containing the polymer of the alkyl methacrylate or of the monomer mixture formed preponderantly of alkyl methacrylate is generally a monomer solution having viscosity in the range of 1 to 1000 poises at 25° C. and containing the polymer in a concentration in the range of 3 to 40% by weight, preferably in the range of 6 to 20% by weight.

The cross-linking agent (B) to be used in the present invention in a monomer containing at least two (meth)acryloyl groups in the molecular unit thereof and having not more than 10 atoms along the main chain interposed between any two of (meth)acryloyl groups, preferably a monomer represented by any of the following three general formulas:

$$MA-O-(CH_2)_n-O-MA \qquad (1)$$

wherein n denotes an integer of the value of 3 to 6 and MA denotes a methacryloyl group,

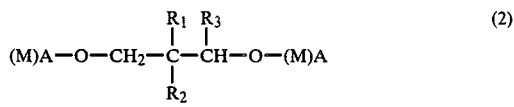

(2)

wherein $R_1$ denotes H, $CH_3$, $C_2H_5$ or $CH_2OH$, $R_2$ denotes H, $CH_3$,

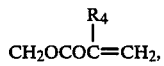

where $R_4$ denotes H or $CH_3$ or $CH_2OH$, $R_3$ denotes H or $CH_3$, $R_1$, $R_2$ and $R_3$ do not denote hydrogen atom all at the same time, and (M)A denotes a methacryloyl group or an acryloyl group, $$(M)AO\text{-}(CH_2CH_2O)_{\overline{n}}(M)A \qquad (3)$$

wherein n denotes either 1 or 2.

Typical examples of the monomer include 1,3-propylene glycol dimethacrylate, 1,4-butylene glycol dimethacrylate, 1,6-hexanediol dimethacrylate, 1,3-butylene glycol dimethacrylate, dimethylol ethane dimethacrylate, 1,1-dimethylol propane dimethacrylate, 2,2-dimethylol propane dimethacrylate, trimethylol ethane tri(meth)acrylate, trimethylol propane tri(meth)acrylate, tetramethylol methane tri(meth)acrylate, tetramethylol methane dimethacrylate, ethylene glycol di(meth)acrylate and diethylene glycol di(meth)acrylate.

The amount of the cross-linking agent (B) to be used is in the range of 2 to 250 parts by weight, preferably 4 to 150 parts by weight, based on 100 parts by weight of the resin raw material (A). If this amount is less than 2 parts by weight, the molded article finally produced fails to show any discernible improvement in heat resistance. If this amount exceeds 250 parts by weight, the finally obtained molded article is too brittle to withstand impacts experienced during actual use.

The methacrylic resin molding material according to this invention is a gel partial polymer which is obtained by heating the mixture of the resin raw material (A) and the cross-linking agent (B) in the presence of a polymerization initiator thereby setting the mixture polymerizing and terminating the polymerization while the whole amount of the monomers present in the mixture is not completely polymerized and part thereof still remains unaltered.

In this case, the content of polymer present in the methacrylic resin molding material which is the gel partial polymer is required to be such as to exceed the polymer content of the mixture of (A) the resin raw material selected from the group consisting of alkyl methacrylate monomers, $\alpha,\beta$-ethylenically unsaturated monomer mixtures formed preponderantly of alkyl methacrylates, and partial polymers thereof and (B) a cross-linking agent by 4 to 62% by weight, more desirably by 10 to 65% by weight, and most desirably by 20 to 65% by weight, though invariably not to exceed the upper limit of 80% by weight. If the polymer content increase as mentioned above is less than 4% by weight, the product of the partial polymerization fails to acquire the form of gel and does not permit easy handling. If the polymer content exceeds the polymer content of the aforementioned mixture by more than 65% by weight or if it exceeds the upper limit of 80% by weight, the produced molding material fails to exhibit satisfactory fluidity during the molding work. Thus, any deviation of the polymer content from the aforementioned range results in failure to fulfil the objects of this invention.

The polymer content of the partial polymer can be determined by the extraction method.

As the polymerization initiator, various substances are available for the polymerization contemplated by this invention. When a polymerization initiator active at low temperatures and a polymerization initiator active at elevated temperatures are used as combined, the reaction for the formation of the gel partial polymer can be effected by the action of the polymerization initiator active at low temperatures and, during the subsequent course for the molding of the gel molding material in a desired shaped article by application of heat, the final polymerization can be effected by the action of the polymerization initiator active at elevated temperatures. It is naturally permissible to use only either of the polymerization initiator active at elevated temperatures and the polymerization initiator active at low temperatures.

As the polymerization initiator active at low temperatures, it is advantageous to use a radical polymerization initiator formed of a peroxide and an azo compound of which the decomposition temperature for obtaining a half life of ten hours, for example, is not more than 50° C. With a view to enhancing the storability of the molding material, the polymerization initiator active at low temperatures is desired to be eliminated as thoroughly as permissable during the polymerization for the production of the molding material. In the respect, the decomposition temperature is desired to fall in the range of 26° to 45° C., preferably 26° to 41° C. The amount of the polymerization initiator active at low temperatures to be used in this case is required to fall in the range of 0.002 to 1% by weight, preferably 0.005 to 0.1% by weight, based on the total weight of the resin raw material of (A) and the cross-linking agent of (B).

Examples of the polymerization initiator active at low temperatures so used in the present invention as described above include (I) acetyl cyclohexylsulfonyl peroxide, isobutyryl peroxide, cumyl peroxy neodecanoate, diisopropyl peroxy dicarbonate, di-n-propyl peroxy dicarbonate, dimyristyl peroxy dicarbonate, diallyl peroxydicarbonate and 2,2'-azobis(4methoxy-2,4-dimethylvaleronitrile), (II) di-(2-ethoxyethyl)peroxy dicarbonate, di-(methoxyisopropyl)-peroxy dicarbonate and di-(2-ethylhexyl)peroxy dicarbonate, and (III) di-(3-methyl-3-methoxybutyl)peroxy dicarbonate, t-butyl peroxy neodecanoate and 2,2'-azobis-(2,4-dimethylvaleronitrile). In all the compounds of the three groups enumerated above, those of the groups (I) and (II) are more desirable and those of the group (I) are most desirable.

As the polymerization initiator active at elevated temperatures it is advantageous to use a polymerization initiator of a peroxide having decomposition temperature in the range of 60° to 220° C. For the purpose of improving the molding cycle and ensuring high storability, the decomposition temperature of this polymerization initiator is desired to fall in the range of 90° to 170° C., preferably 120° to 170° C. The amount of the polymerization initiator active at elevated temperatures to be used in this invention is required to fall in the range of 0.02 to 2.0% by weight, preferably 0.05 to 2.0% by weight, based on the total weight of the resin raw material of (A) and the cross-linking agent of (B).

Examples of the polymerization initiator active at elevated temperatures include (IV) t-butylcumyl peroxide, diisopropylbenzene hydroperoxide, di-t-butyl peroxide, p-menthane hydroperoxide, 2,5-dimethyl-2,5-di-(t-butylperoxy)-hexyl-3,1,1,3,3-tetramethylbutyl hydroperoxide, 2,5-dimethylhexane-2,5-dihydroperoxide, cumene hydroperoxide, t-butylhydroperoxide and 1,2,2,2-tetraphenyl-1,2-ethane diol, (V) 1,1-bis(t-butylperoxy)-3,3,5-trimethyl cyclohexane, 1,1-bis(t-butylperoxy)-cyclohexane, t-butyl peroxymaleic acid, t-butyl peroxylaurate, t-butylperoxy-3,5,5-trimethylhexanoate, cyclohexanone peroxide, t-butyl peroxyisopropyl carbonate, 2,5-dimethyl,2,5-di(benzoylperoxy)-hexane, 2,2-bis(t-butylperoxy) octane, t-butyl peroxyacetate 2,2-bis(t-butylperoxy)butane, t-butylperoxy benzoate, n-butyl-4,4-bis(t-butylperoxy)valerate, di-t-butyl diperoxy isophthalate, methylethyl ketone peroxide, bis(t-butylperoxyisopropyl)benzene, dicumyl peroxide, and 2,5-dimethyl-2,5-di(t-butylperoxy)hexane, (VI) t-butyl hydroperoxide, m-toluoyl peroxide, t-butyl peroxy isobutyrate, 2,3-dimethyl-2,3-diphenyl butane, octanoyl peroxide, decanoyl peroxide, lauroyl peroxide, stearoyl peroxide, propionyl peroxide, succinic acid peroxide, acetyl peroxide and 1,1'-azobis(cyclohexane-1-carbonitrile). In the compounds of the three groups enumerated above, those of the groups (IV) and (V) are more desirable and those of the group (IV) are particularly desirable.

As described above, the methacrylic resin molding material of the present invention is produced by heating the mixture of the resin raw material (A) and the cross-linking agent of (B) in the presence of the polymerization initiator thereby setting the mixture polymerizing. This polymerization reaction is carried out at a temperature in the range of 10° to 80° C. preferably 35° to 65° C., for a period of 10 to 200 minutes, preferably 20 to 150 minutes. When the two polymerization initiators, one active at low temperatures and the other active at elevated temperatures are used as combine, the former polymerization initiator is substantially consumed and the latter polymerization initiator remains almost unchanged because of its incapability of decomposition at the reaction temperature. The latter polymerization initiator so surviving the reaction is consumed during the subsequent course of molding of the resultant molding in the prescribed shape.

In accordance with the present invention, when the polymerization reaction is stopped as by sudden cooling of the reaction system, there is obtained the gel partial polymer of desired conversion. Further in accordance with the present invention, the methacrylic resin molding material which is the gel partial polymer can be easily obtained in a desired conversion by adding a specific regulating agent in a specific amount during thermal polymerization of the mixture of the resin raw material (A) and the crosslinking agent (B) in the presence of the polymerization initiator. Examples of the specific regulating agent usable for this purpose include 1,4-(8)-p-menthadiene, 2,6-dimethyl,2,4,6-octatriene, 1,4-p-menthadiene, 1,4-cyclohexadiene and α-methyl styrene dimer.

The regulating agent is added in an amount falling in the range of 0.0001 to 0.5% by weight, more desirably 0.001 to 0.2% by weight, and most desirably 0.005 to 0.1% by weight, based on the total amount of the aforementioned resin raw material (A) and the cross-linking agent (B). If the amount of the regulating agent so added is less than 0.0001% by weight, then the effect of the addition of the regulating agent is not manifested. If this amount exceeds 0.5% by weight, the polymerization is retarded too much to proceed to a desired conversion.

By the method of this invention, the desired conversion is attainable by selecting adequately the amount of the regulating agent, the amount of the radical polymerization initiator active at low temperatures, and the temperature of polymerization. For example, as the amount of the polymerization initiator active at low temperatures is decreased, the rate of polymerization is notably slowed at a low conversion. The rate of polymerization is slowed at a low conversion and the time required for the polymerization to reach the desired conversion is prolonged in proportion as the amount of the regulating agent is increased.

In accordance with the method of this invention, the gel partial polymer can be obtained at a desired conversion by suddenly cooling the polymerization system while in progress and thereby stopping the polymerization reaction or by controlling the amount of the polymerization initiator thereby slowing the rate of polymerization velocity in the desired conversion range. By the second method of this invention using a regulating agent, the gel partial polymer can be obtained at a desired conversion with high reproducibility by a simpler procedure. This method also permits the gel partial polymer to be obtained with improved storability.

Optionally, the mixture prepared as the raw material for the partial cross-linking polymerization aimed at the production of the gel partial polymer may incorporate various additives such as chain transfer agent, coloring agent, and filler and other resin as well. Examples of the chain transfer agent include n-alkyl and t-alkyl mercaptans having 11 or 12 carbon atoms in the alkyl group thereof, thio-glycolic acid, and thio-glycolic alkyl esters having 11 to 8 carbon atoms in the alkyl group thereof.

As the coloring agent, any of the conventional dyes and pigments can be used. Examples of the filler include glass fibers, calcium carbonate, silica, aluminum hydroxide, glanular carbon, carbon fibers, mica flakes, calcium phosphate, barium sulfate, magnesium oxide and tin oxide.

The methacrylic type molding material according to this invention is not sticky and possesses shape-retaining property and, therefore, can be conveniently handled in any desired form such as, for example, sheet, rod, block, flakes and pellets. By the application of shear stress at normal room temperature or at elevated temperatures, the molding material is enabled to flow. Thus, it can be molded even in the complicated shape not attainable by the cast polymerization.

The methacrylic resin molding material according to present invention can be molded to produce a molded article of a desired shape by the compression molding, extrusion molding injection molding, or transfer molding method, for example, performed at a temperature in the range of 90° to 180° C., preferably 100° to 150° C., for a period of 1 to 30 minutes, preferably 3 to 15 minutes.

For the sake of convenience on molding, kneading may be conducted prior to molding or fillers or other additives may be incorporated, if necessary.

Now, the present invention will be described more specifically below with reference to working examples.

In the working examples cited below, the polymer content in the partial polymer was determined by the following procedure.

In a constant temperature water bath kept at 50° C., a Soxhlet extractor containing 150 ml of dichloromethane having 1,000 ppm of hydroquinone monomethyl ether dissolved therein and holding a 15-g strip of given gel partial polymer inserted in a tubular filter paper for extraction is left standing for 20 hours to effect reflux extraction. At the end of the extraction, the extract is placed in 1,200 ml of methanol to separate the polymer component. The polymer so separated and the polymer retained in the tubular filter paper are combined and dried under a vacuum at 55° C. until a constant weight. The polymer so obtained is weighed.

The following abbreviations are used in the working examples.

PCND Cumyl peroxy neodecanoate
V-70 2,2'-Azobis-(4-methoxy-2,4-dimethylvaleronitrile)
PBIB Tertiary butyl peroxyisobutyrate
BP 1,1,2,2-Tetraphenyl-1,2-ethanediol
PBD Di-t-butyl peroxide
BC 2,3-Dimethyl-2,3-diphenyl butane
V-40 1,1'-Azobis-(cyclohexane-1-carbonitrile)

All parts and percentages are by weight unless otherwise specified.

EXAMPLE 1

A mixture obtained by dissolving 80 parts of monomeric methyl methacrylate containing 10% of polymethyl methacrylate having an average degree of polymerization of about 8,000, 20 parts by neopentyl glycol dimethacrylate, 0.01 part of 1,4(8)-p-menthadiene, 0.003 part of V-70, 0.3 part of PBD and 0.01 part of BC in one another was poured into a cell formed by opposing two glass sheets across a space 5 mm in thickness and left polymerizing therein at 50° C. for three hours to give rise to a gel partial polymer. The gel partial polymer was found to have a polymer content of 31.7%. In a metal die designed to produce a pen tray measuring 69×208 mm² in top area, 54×194 mm² in bottom area, 18 mm in dpeth, and 2.5 mm in wall thickness, 70 g of the gel partial polymer was press molded. With the metal die kept at 135° C., the polymer was kept under initial pressure of 20 kg/cm² for 120 second and it was subsequently kept under increased pressure of 80 kg/cm² for eight minutes. Then, the temperature of the metal die was lowered to 130° C. and the molded mass of the polymer was removed from the metal die. During the molding, the gel partial polymer flowed and filled the whole cavity of the metal die to produce a clear molded article conforming exactly to the cavity of the metal die. The molded article was heat-treated at 130° C. for eight hours. Then it was tested for heat distortion temperature as specified by JIS K7207, which was found to be 141° C. When this molded article was subjected to the falling sand abrasion test as specified by ASTM D-673, the haze difference was found to be 21%.

EXAMPLE 2

A mixture obtained by dissolving 80 parts of monomeric MMA, 20 parts of 2,2-dimethylol propane dimethacrylate, 0.015 part of 1,4(8)-p-menthadiene, 0.01 part of PCND, 3 parts of PBD and 0.01 part of BC in one another was poured into a glass cell containing a space 10 mm in thickness similar to Example 1. The mixture was left polymerizing at 60° C. for one hour. Thus was obtained a gel partial polymer having a polymer content of 22.0%.

In the metal die of Example 1, the gel partial polymer was press molded. With the metal die kept at 135° C., the polymer was held under initial pressure of 20 kg/cm² for 30 seconds and then under increased pressure of 80 kg/cm² for seven minutes. The temperature of the metal die was lowered to 130° C. and the molded polymer was removed from the metal die. During the molding, the gel partial polymer flowed throughout the cavity of the metal die and produced a clear molded article conforming exactly to the cavity of the metal die. The molded article was heat-treated at 130° C. for eight hours and then tested for heat distortion temperature, which was found to be 142° C.

EXAMPLE 3

A mixture obtained by dissolving 30 parts of the syrup of Example 1, 70 parts of 2,2-dimethylol propane dimethacrylate, 0.02 part of 1,4(8)-p-menthadiene, 0.01 part of PCND, and 0.3 part of PBD in one another was poured into a glass cell containing a space 5 mm in thickness and left polymerizing at 60° C. for two hours. At the end of the polymerization, the product was taken out of the cell. It was a gel partial polymer having a polymer content of 48.0%.

In the metal die of Example 1, this gel partial polymer was press molded. With the metal die kept at 140° C., the polymer was held under initial pressure of 20 kg/cm² for 30 seconds and then under increased pressure of 80 kg/cm² for seven minutes. It was immediately removed from the metal die. During the molding, the gel partial polymer flowed throughout the cavity of the metal die and produced clear molded article conforming exactly to the cavity of the metal die. The molded article so obtained was heat-treated at 130° C. for eight hours and tested for heat distortion temperature, which was found to be not less than 145° C. When it was subjected to the falling sand abrasion test, the haze difference was found to be 12%.

EXAMPLE 4

A mixture obtained by dissolving 90 parts of methyl methacrylate monomer containing 5% of polymethyl methacrylate having an average degree of polymerization of about 8,000, 10 parts of 2,2-dimethylol propane dimethacrylate, 0.01 part of 1,4(8)-p-menthadiene, 0.01 part of PCND and 0.3 part of PBD in one another was poured into a glass cell containing a space 10 mm in thickness and left polymerizing at 60° C. for two hours. The product was removed from the glass cell. It was a gel partial polymer having a polymer content of 43.0%.

In the metal die of Example 1, the gel partial polymer was press molded. With the metal die kept at 135° C., the polymer was held under initial pressure of 20 kg/cm² for two minutes and then under increased pressure of 80 kg/cm² for seven minutes. The temperature of the metal die was lowered to 130° C. and the molded polymer was removed. During the molding, the gel partial polymer flowed to produce a clear molded article conforming exactly to the cavity of the metal die.

EXAMPLE 5

A mixture obtained by dissolving 90 parts of the syrup of Example 1, 10 parts of 2,2-dimethyl propane dimethacrylate, 0.01 part of 1,4(8)-p-menthadiene, 0.1 part of PBIB, 0.01 part of BP and 0.01 part of BC in one another was poured into a glass cell containing a space 10 mm in thickness and left polymerizing at 60° C. for two hours. The product was then removed from the glass cell. It was a gel partial polymer having a polymer content of 34.7%.

In a metal die designed to produce a flat plate 150×150 mm² in size, the gel partial polymer was press molded.

With the metal die kept at 130° C., the gel partial polymer was held under initial pressure of 15 kg/cm² for one minute and then under increased pressure of 65 kg/cm² for ten minutes. The temperature of the metal die was lowered to 120° C. and the molded polymer was removed. During the molding, the gel partial polymer flowed within the cavity of the metal die and produced a clear flat molded article conforming exactly to the cavity of the metal die. It was heat-treated at 130° C. for three hours and then tested for physical properties. The results were as shown below.

|  | Heat distortion temperature | Izod impact strength (unnotched) | Tensile strength | Elongation | Elastic modulus | Bending strength | Rockwell hardness(M) |
|---|---|---|---|---|---|---|---|
| Example 5 | 123° C. | 19.7 kg · cm/cm | 710 kg/cm² | 4.4% | 3.5 kg/cm² | 1212 kg/cm² | 106 |
| Commercially available acrylic resin molding material | 84 | 15.0 | 680 | 6 | — | 1050 | 89 |
| Commercially | 92 | — | 740 | 5 | 3.3 | 1150 | 97 |

|   | Heat distortion temperature | Izod impact strength (unnotched) | Tensile strength | Elongation | Elastic modulus | Bending strength | Rockwell hardness(M) |
|---|---|---|---|---|---|---|---|
| available extruded sheet of acrylic resin | | | | | | | |

EXAMPLE 6

A mixture obtained by dissolving 90 parts of monomeric methyl methacrylate containing 36% of polymethyl methacrylate having an average degree of polymerization degree of about 850, 10 parts of trimethylol propane trimethacrylate, 0.01 part of 1,4(8)-p-menthadiene, 0.01 part of PCND and 0.3 part of PBD in one another was poured into a cell containing a space 5 mm in thickness and left polymerizing therein at 60° C. for two hours. The product was removed from the metal die. It was a gel partial polymer having a polymer content of 58%.

In the metal die of Example 1, the gel partial polymer was press molded. With the metal die kept at 135° C., the polymer was held under initial pressure of 20 kg/cm² for 30 seconds and under increased pressure of 80 kg/cm² for seven minutes. The temperature of the metal die was lowered and the formed polymer was removed. During the molding, the gel partial polymer flowed and produced a molded article conforming exactly to the cavity of the metal die.

EXAMPLE 7

A mixture obtained by dissolving 80 parts of monomeric methyl methacrylate, 20 parts of 2,2-dimethyl propane dimethacrylate, 0.01 part of 1,4(8)-p-menthadiene, 0.01 part of PCND and 0.01 part of BC in one another was poured into a glass cell containing a space 10 mm in thickness and left polymerizing at 55° C. for one hour. The product was removed from the glass cell. It was a gel partial polymer having a polymer content of 4%.

In the metal die of Example 1, the gel partial polymer was press molded. With the metal die kept at 130° C., the polymer was held under initial pressure of 20 kg/cm² for three minutes and then at increased pressure of 80 kg/cm² for eight minutes. The temperature of the metal die was lowered to 110° C. and the formed polymer was removed from the metal die. During the molding, the gel partial polymer flowed and produced a molded article conforming exactly to the cavity of the metal die.

EXAMPLE 8

A mixture obtained by dissolving 90 parts of the syrup of Example 1, 10 parts of ethylene glycol dimethacrylate, 0.2 part of 1,4-cyclohexadiene, 0.01 part of PCND, and 0.3 part of PBD in one another was poured into a glass cell containing a space 5 mm in thickness and left polymerizing at 60° C. for two hours. The product was removed from the glass cell. It was a gel partial polymer having a polymer content of 32.2%.

In the metal die of Example 1, the gel partial polymer was press molded. With the metal die kept at 135° C., the polymer was held under initial pressure of 20 kg/cm² for 30 seconds and then under increased pressure of 80 kg/cm² for eight minutes. The temperature of the metal die was lowered to 110° C. and the formed polymer was removed from the metal die. During the molding, the gel partial polymer flowed and produced a clear molded article conforming exactly to the cavity of the metal die.

EXAMPLE 9

A mixture obtained by dissolving 90 parts of the syrup of Example 1, 10 parts of 1,6-hexanediol dimethacrylate, 0.02 part of 1,4(8)-p-menthadiene, 0.01 part of PCND and 0.3 part of PBD in one another was poured into a glass cell containing a space 5 mm in thickness and left polymerizing at 60° C. for two hours. The product was removed from the glass cell. It was a gel partial polymer having a polymer content of 62%.

In the metal die of Example 1, this gel partial polymer was press molded under the same conditions as in Example 8. Consequently, there was obtained a clear molded article conforming exactly to the cavity of the metal die.

EXAMPLE 10

The same composition as used in Example 9, except that 1,3-butylene glycol dimethacrylate was used in place of 1,6-hexanediol dimethacrylate, was poured into a glass cell containing a space 5 mm in thickness and left polymerizing at 60° C. for two hours. The product was removed from the glass cell. It was a gel partial polymer having a polymer content of 43.1%.

When this gel partial polymer was press molded by following the procedure of Example 9, there was obtained a clear molded article conforming exactly to the cavity of the metal die.

EXAMPLE 11

A mixture obtained by dissolving 90 parts of the syrup of Example 1, 10 parts of 2,2-dimethylol propane dimethacrylate, 0.01 part of 1,4(8)-p-menthadiene, 0.01 part of PCND, and 0.01 part of BC in one another was poured into a glass cell containing a space 5 mm in thickness and left polymerizing at 70° C. for five hours. The product was removed from the metal die. It was a gel partial polymer having a polymer content of 59%.

In the metal die of Example 1, the gel partial polymer was molded. With the metal die kept at 130° C., the polymer was held under initial pressure of 15 kg/cm² for 10 second and then under increased pressure of 65 kg/cm² for one minute. The molded polymer was immediately removed from the metal die. Consequently, there was obtained a flat molded article conforming exactly to the cavity of the metal die.

EXAMPLE 12

The same composition as used in Example 11, except that 2,6-dimethyl-2,4,6-octatriene was used in place of 1,4(8)-p-menthadiene was poured into a glass cell containing a space 5 mm in thickness and left polymerizing at 60° C. for 2.5 hours. The product was removed from the glass cell. It was a gel partial polymer having a polymer content of 51%.

By press molding this gel partial polymer under the same conditions as in Example 8, there was obtained a clear molded article conforming exactly to the cavity of the metal die.

EXAMPLE 13

The same composition as used in Example 11, except that alpha-methyl styrene dimer was used in place of 1,4(8)-p-menthadiene, was poured into a glass cell containing a space 5 mm in thickness and left polymerizing at 60° C. for 2.5 hours. The product was removed from the glass cell. It was a gel partial polymer having a polymer content of 54%. By press molding this gel partial polymer under the same conditions as in Example 8, there was obtained a clear molded article conforming exactly to the cavity of the metal die.

EXAMPLE 14

A mixture obtained by dissolving 90 parts of the syrup of Example 1, 10 parts of 2,2-dimethylol propane dimethacrylate, 0.003 part of V-70 and 0.5 part of V-40 in one another was poured into a glass cell containing a space 10 mm in thickness and left polymerizing at 60° C. for 1.5 hours. Then, the glass cell and the product therein were transferred into cold water at 10° C. to cool the product suddenly. The product was then removed from the glass cell. It was a gel partial polymer having a polymer content of 39.8%. By press molding this gel partial polymer under the same conditions as in Example 8, there was obtained a clear molded article conforming exactly to the cavity of the metal die.

EXAMPLE 15

A mixture obtained by dissolving 10 parts of the syrup of Example 1, 70 parts of monomeric methyl methacrylate, 20 parts of 2,2-dimethylol propane glycol dimethacrylate and 0.1 part of PBIB in one another was poured into a glass cell containing a space 10 mm in thickness and left polymerizing at 60° C. for 1.5 hours. The product as held in the glass cell was transferred into cold water at 10° C. to cool the product suddenly. The product was removed from the glass cell. It was a gel partial polymer having a polymer content of 5.0%. When this gel partial polymer under the same conditions as in Example 8, there was obtained a clear molded article conforming exactly to the cavity of the metal die. Separately, the same gel partial polymer was sealed in a polyvinyl alcohol film, stored in a dark place at 5° to 15° C. for two weeks. After the standing, the polymer was press molded under the same conditions as described above. Consequently, there was obtained a molded article similar to the molded article obtained by the press molding immediately after the polymerization.

EXAMPLE 16

A mixture obtained by dissolving 85 parts of the syrup of Example 1, 15 parts of 2,2-dimethylol propane dimethacrylate, 0.01 part of 1,4(8)-p-menthadiene, 0.01 part of PCND, and 0.5 part of BC in one another was poured into a glass cell containing a space 10 mm in thickness and left polymerizing at 60° C. for 1.5 hours. The product was removed from the glass cell. It was a gel partial polymer having a polymer content of 44.3%. In the metal die of Example 1, the gel partial polymer was molded. With the metal die kept at 135° C., the polymer was held under initial pressure of 20 kg/cm² for 120 second and then under increased pressure of 80 kg/cm² for 14 minutes. The temperature of the metal die was lowered to 130° C. and the molded polymer was removed from the metal die. Consequently, there was obtained a clear molded article conforming exactly to the cavity of the metal die.

Separately, the same gel partial polymer was sealed in a polyvinyl alcohol film, stored in a dark place at 5° to 15° C. for eight weeks. This polymer was press molded under the same conditions as described above. Consequently, there was obtained a molded article similar to the molded article obtained by the press molding immediately after the polymerization.

Control 1

A mixture obtained by dissolving 90 parts of monomeric methyl methacrylate, 10 parts of 2,2-dimethylol propane dimethacrylate, 0.001 part of 1,4(8)-p-menthadiene, and 0.1 part of PBIB in one another was poured into a glass cell containing a space 5 mm in thickness and left polymerizing at 60° C. for 1.5 hours. The product was removed from the glass cell. It was found to have a polymer content of 85.4%.

In the metal die of Example 1, the polymer was press molded at a metal die temperature of 135° C. under pressure of 140 kg/cm². This partial polymer did not flow in the cavity of the metal die. When it was removed after seven minutes' standing in the metal die, it was wholly pulverized into particles of the size of fine sand. No molded article was obtained.

Control 2

A mixture obtained by dissolving 100 parts of polyethylene glycol (n=14) dimethacrylate, 0.01 part of 1,4(8)-p-menthadiene, 0.01 part of PCND and 0.3 part of PBD in one another was poured into a glass cell containing a space 5 mm in thickness and left polymerizing at 60° C. for two hours. Then the product was removed from the glass cell. It was found to have a polymer content of 58%. When the gel partial polymer was press molded under the same conditions as in Example 8, there was obtained a clear molded article conforming exactly to the cavity of the metal die. This molded article was soft and extremely fragile and could not withstand impacts encountered in actual use.

Control 3

When the procedure of Example 11, was repeated, except that the amount of 1,4(8)-p-menthadiene was changed to 0.55 part, there was obtained a gel partial polymer. When this gel partial polymer was pressed in a flat-plate metal die at 130° C., it failed to get cured. When it was held under initial pressure of 20 kg/cm² for three minutes and then under increased pressure, most of the polymer flowed out. When the metal die was opened after ten minutes' standing, there was obtained a thin sheet. It was not in a cured form.

Control 4

A mixture obtained by dissolving 80 parts of the syrup of Example 4, 20 parts of 2,2-dimethylol propane dimethacrylate, 0.01 part of PCND and 0.3 part of PBD in one another was poured into a glass cell containing a space 5 mm in thickness and left polymerizing at 60° C. for two hours. Then, the content of the glass cell was removed. It was found to have a polymer content of 76.5%. In the metal die of Example 1, the gel partial polymer was press molded at a metal die temperature of 135° C. under pressure of 140 kg/cm². During the molding the gel partial polymer did not flow. When the metal die was opened after 14 minutes' standing, the material did not fill the cavity of the metal die completely. It was an incomplete molded article, with fine cracks running throughout the entire area.

Control 5

A mixture obtained by dissolving 70 parts of monomeric methyl methacrylate containing 25% of polymethyl methacrylate having an average polymerization degree of about 850, 30 parts of 2,2-dimethylol propane dimethacrylate, 0.002 part of 1,4(8)-p-menthadiene, 0.01 part of PCND and 0.3 part of PBD in one another was poured into a glass cell containing a space 5 mm in thickness and left polymerizing at 63° C. for two hours. Then, the product was removed from the glass cell. It was found to have a polymer content of 85.0%. In the metal die of Example 1, the gel partial polymer was press molded at a metal die temperature of 135° C. under maximum pressure of 140 kg/cm². During the molding, this gel partial polymer did not flow. When the metal die was opened after eight minutes' standing, the material was found to have grown in size. It, however, did not fill the cavity of the metal die completely. Thus, there was not obtained a molded article conforming exactly to the cavity of the metal die.

What is claimed is:

1. A methacrylic resin molding material comprising a partially cross-linked polymer gel obtained by partially polymerizing a mixture comprising (A) a resin raw material selected from the group consisting of monomeric C1-C4-alkyl methacrylates, α,β-ethylenically unsaturated monomer mixtures formed predominantly of C1-C4-alkyl methacrylates, and a syrup containing at least one of said monomers and at least one of the polymers thereof and (B) 4 to 150 parts by weight of a cross-linking agent based on 100 parts by weight of said resin raw material in the presence of a polymerization initiator, whereby a cross-linked polymer is formed with the aid of said cross-linking agent and said polymerization initiator to the extent that the total polymer content reaches between 4 to 62% by weight over the polymer content of said mixture with the total polymer content kept from exceeding the upper limit of 62% by weight, said molding material being recovered from the polymerization system as a non-sticky, easy-handled, kneadable gel-like material which has shape-retaining properties, but which, on the application of shear stress, at normal room temperature or at an elevated temperature, is enabled to flow, and preserved for use in the manufacture of shaped articles.

2. A molding material according to claim 1, wherein said alkyl methacrylate is methyl methacrylate.

3. A molding material according to claim 1, wherein said cross-linking agent (B) is a monomer containing at least two (meth)acryloyl groups in the molecular unit thereof and having not more than 10 atoms along the main chain interposed between any two of said (meth)acryloyl groups.

4. A molding material according to claim 3, wherein said cross-linking agent (B) is a monomer represented by a general formula:

$$MA-O-(CH_2)_n-O-MA \quad (1)$$

wherein n denotes an integer of the value of 3 to 6 and MA denotes a methacryloyl group.

5. A molding material according to claim 3 wherein said cross-linking agent (B) is a monomer represented by a general formula:

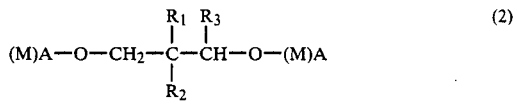

wherein $R_1$ denotes H, $CH_3$, $C_2H_5$ or $CH_2OH$, $R_2$ denotes H, $CH_3$,

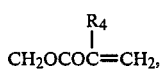

where $R_4$ denotes H or $CH_3$ or $CH_2OH$, $R_3$ denotes H or $CH_3$, $R_1$, $R_2$ and $R_3$ do not denote hydrogen atom all at the same time, and (M)A denotes a methacryloyl group or an acryloyl group.

6. A molding material according to claim 3, wherein said cross-linking agent (B) is a monomer represented by the general formula:

$$(M)AO-(CH_2CH_2O)_n(M)A \quad (3)$$

wherein n denotes either 1 or 2 and (M)A denotes a methacrylol group or acryloyl group.

7. A molding material according to claim 5, wherein said monomer is 2,2-dimethylol propane dimethacrylate.

8. A method for the production of methacrylic resin molding material formed of a partially cross-linked polymer gel obtained by partially polymerizing a mixture comprising (A) a resin raw material selected from the group consisting of monomeric C1-C4-alkyl methacrylates, α,β-ethylenically unsaturated monomer mixtures formed predominantly of C1-C4-alkyl methacrylates, and a syrup containing at least one of said monomers and at least one of the polymers thereof and (B) 4 to 150 parts by weight of a cross-linking agent based on 100 parts by weight of said resin raw material in the presence of a polymerization initiator, whereby a cross-linked polymer is formed with the aid of said cross-linking agent and said polymerization initiator to the extent that the total polymer content reaches between 4 to 62% by weight over the polymer content of said mixture with the total polymer content kept from exceeding the upper limit of 62% by weight, recovering from the polymerization system the so-obtained non-sticky, easy-handled, kneadable gel-like material which has shape-retaining properties, but which, on the application of shear stress, at normal room temperature or at an elevated temperature, is enabled to flow, and preserving the same for use in the manufacture of shaped articles.

9. A method according to claim 8, wherein said polymerization is carried out at a temperature in the range of 10° to 80° C.

10. A method according to claim 8, wherein said polymerization initiator comprises a polymerization initiator active at low temperatures and a polymerization initiator active at elevated temperatures.

11. A method according to claim 8, wherein said alkyl methacrylate is methyl methacrylate.

12. A method according to claim 8, wherein said cross-linking agent (B) is a monomer containing at least two (meth)acryloyl groups in the molecular unit thereof and having not more than 10 atoms along the main chain interposed between any two of said (meth)acryloyl groups.

13. A method according to claim 12, wherein said cross-linking agent (B) is a monomer represented by a general formula:

$$MA-O-(CH_2)_n-O-MA \quad (1)$$

wherein n denotes an integer of the value of 3 to 6 and MA denotes a methacryloyl group.

14. A method according to claim 12, wherein said cross-linking agent (B) is a monomer represented by a general formula:

$$(M)A-O-CH_2-\underset{\underset{R_2}{|}}{\overset{\overset{R_1}{|}}{C}}-\overset{\overset{R_3}{|}}{CH}-O-(M)A \quad (2)$$

wherein $R_1$ denotes H, $CH_3$, $C_2H_5$ or $CH_2OH$, $R_2$ denotes H, $CH_3$, $$\underset{}{\overset{\overset{R_4}{|}}{CH_2OCOC}}=CH_2,$$

where $R_4$ denotes H or $CH_3$ or $CH_2OH$, $R_3$ denotes H or $CH_3$, $R_1$, $R_2$ and $R_3$ do not denote hydrogen atom all at the same time, and (M)A denotes a methacrylol group or an acryloyl group.

15. A method according to claim 12, wherein said cross-linking agent (B) is a monomer represented by a general formula:

$$(M)AO-CH_2CH_2O)_n(M)A \quad (3)$$

wherein n denotes either 1 or 2 and (M)A denotes a methacryloyl group or an acryloyl group.

16. A method according to claim 14, wherein said monomer is 2,2-dimethylol propane dimethacrylate.

17. A method for preparing a shaped article composed of polymeric methacrylic resin materials which method comprises supplying a compression mold, an extrusion mold, an injection mold or a transfer mold with a methacrylic resin molding material capable of further polymerization at a temperature in the range of 90° to 180° C. and heating the same to said temperature, to carry out the completion of the polymerization of the remaining monomer and thereby to effect formation of articles of desired shape in the mold, wherein the said methacrylic resin molding material is a partially cross-linked polymer gel obtained by partially polymerizing a mixture comprising (A) a resin raw material selected from the group consisting of monomeric C1–C4-alkyl methacrylates, α,β-ethylenically unsaturated monomer mixtures formed predominantly of C1–C4-alkyl methacrylates, and a syrup containing at least one of said monomers and at least one of the polymers thereof and (B) 4 to 150 parts by weight of a cross-linking agent based on 100 parts by weight of said resin raw material in the presence of a polymerization initiator, whereby a cross-linked polymer is formed with the aid of said cross-linking agent and said polymerization initiator to the extent that the total polymer content reaches between 4 to 62% by weight over the polymer content of said mixture with the total polymer content kept from exceeding the upper limit of 62% by weight, recovering from the polymerization system the so-obtained non-sticky, easy-handled, kneadable gel-like material which has shape-retaining properties, but which, on the application of shear stress, at normal room temperature or at elevated temperatures, is enabled to flow.

18. A method accoriing to claim 17, wherein said alkyl methacrylate is methyl methacrylate.

19. A method according to claim 17, wherein said cross-linking agent (B) is a monomer containing at least two (meth)acrylol groups in the molecular unit thereof and having not more than 10 atoms along the main chain interposed between any two of said (meth)acryloyl groups.

20. A method according to claim 19, wherein said cross-linking agent (B) is a monomer represented by a general formula:

$$MA-O-(CH_2)_n-O-MA \quad (1)$$

wherein n denotes an integer of the value of 3 to 6 and MA denotes a methacryloyl group.

21. A method according to claim 19, wherein said cross-linking agent (B) is a monomer represented by a general formula:

$$(M)A-O-CH_2-\underset{\underset{R_2}{|}}{\overset{\overset{R_1}{|}}{C}}-\overset{\overset{R_3}{|}}{CH}-O-(M)A \quad (2)$$

wherein $R_1$ denotes H, $CH_3$, $C_2H_5$ or $CH_2OH$, $R_2$ denotes H, $CH_3$, $$\underset{}{\overset{\overset{R_4}{|}}{CH_2OCOC}}=CH_2,$$

where $R_4$ denotes H or $CH_3$ or $CH_2OH$, $R_3$ denotes H or $CH_3$, $R_1$, $R_2$ and $R_3$ do not denote hydrogen atom all at the same time, and (M)A denotes a methacryloyl group or an acryloyl group.

22. A method according to claim 19, wherein said cross-linking agent (B) is a monomer represented by a general formula:

$$(M)AO-(CH_2CH_2O)_{\overline{n}}(M)A \quad (3)$$

wherein n denotes either 1 or 2 and (M)A denotes a methacryloyl or acryloyl group.

23. A method according to claim 21, wherein said monomer is 2,2-dimethylol propane dimethacrylate.

24. A molding material according to claim 1, wherein said partially cross-linked polymer gel is kneaded prior to molding.

25. A method according to claim 10, wherein said polymerization initiator active at low temperatures is decomposed during said polymerization.

26. A method according to claim 8, wherein said partially cross-linked polymer gel is kneaded prior to molding.

27. A method according to claim 8, wherein said polymerization is carried out in the presence of both a polymerization initiator and a regulating agent.

28. A method according to claim 27, wherein the amount of said regulating agent to be added is in the range of 0.0001 to 0.5% by weight based on the total amount of said resin raw material (A) and said cross-linking agent (B).

29. A method according to claim 28, wherein the amount of said regulating agent is in the range of 0.001 to 0.2% by weight.

30. A method according to claim 27, wherein said regulating agent is selected from the group consisting of 1,4(8)-p-menthadiene, 2,6-dimethyl-2,4,6-octatriene, 1,4-p-menthadiene, and 1,4-cyclohexadiene.

31. A method according to claim 17, wherein said polymerization initiator comprises a polymerization initiator active at low temperatures and a polymerization initiator active at elevated temperatures.

32. A method according to claim 31, wherein said polymerization initiator active at low temperatures is decomposed during said polymerization.

33. A method according to claim 17, wherein said partially cross-linked polymer gel is kneaded prior to molding.

* * * * *

UNITED STATES PATENT AND TRADEMARK OFFICE
CERTIFICATE OF CORRECTION

PATENT NO. : 4,791,184
DATED : December 13, 1988
INVENTOR(S) : Haruo Nagai, Tetsuo Suzuki and Kazuhiro Sato It is certified that error appears in the above-identified patent and that said Letters Patent is hereby corrected as shown below:

Title Page, [73] Assignee:, line 2; "Niigata," should read -- Tokyo, --
Title Page, [30] Foreign Application Priority Data; "59-258" should read -- 57-258 --

Title Page, [57] ABSTRACT, line 7; after "methacrylates" insert a comma -- , --
Title Page, [57] ABSTRACT, line 17; after "weight" insert a comma -- , --
Col. 2, line 21; after "monomer" insert the following: -- polymerizing and terminating the first stage of --
Col. 5, line 23; "65%" should read -- 62% --

Col. 5, line 24; "65%" snould read -- 62% --
Col. 5, line 25; "80%" should read -- 62% --
Col. 5, line 62; "permissable" should read -- permissible --
Col. 6, line 62; after "material" insert -- of --
Col. 7, line 2; "combine," should read -- combined, --
Col. 9, line 3; "dpeth," should read -- depth, --
Col. 12, line 57; "second" should read -- seconds --
Col. 13, line 45; "5.0%." should read -- 51.0%. --
Col. 14, line 45; after "Example 11" delete the comma ","
Col. 16, line 14; insert a space between "$R_3$" and "denotes"

UNITED STATES PATENT AND TRADEMARK OFFICE
CERTIFICATE OF CORRECTION

PATENT NO. : 4,791,184
DATED : December 13, 1988
INVENTOR(S) : Haruo Nagai, Tetsuo Suzuki and Kazuhiro Sato It is certified that error appears in the above-identified patent and that said Letters Patent is hereby corrected as shown below:

Col. 16, line 25; "methacrylol" should read -- methacryloyl --

Col. 17, line 27; "methacrylol" should read -- methacryloyl --
Col. 17, line 33; "$(M)AO\text{---}CH_2CH_2O)_n(M)A$" should read
-- $(M)AO-(CH_2CH_2O)_n-(M)A$ --

Col. 18, line 3; "accoriing" should read -- according --
Col. 18, line 7; "(meth)acrylol" should read -- (meth)acryloyl --

Signed and Sealed this

Nineteenth Day of December, 1989

Attest:

JEFFREY M. SAMUELS

Attesting Officer  Acting Commissioner of Patents and Trademarks